Nov. 3, 1953     F. R. MILSOM     2,657,579
LIQUID LEVEL INDICATING DEVICE
Filed Feb. 4, 1952
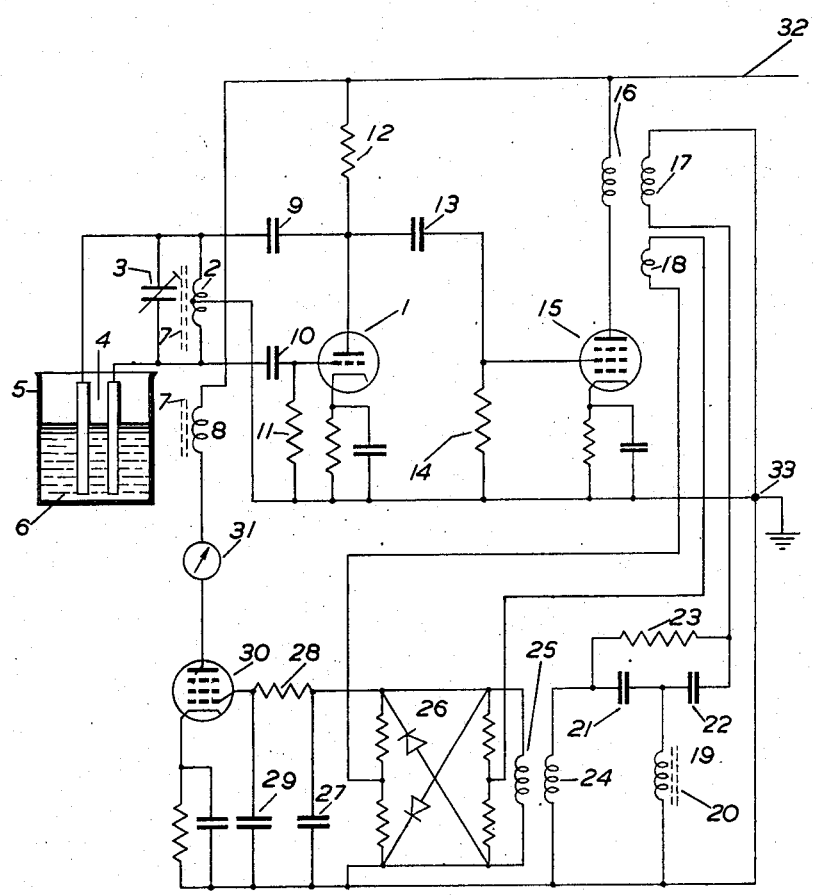
F. R. MILSOM
Inventor
By Moore & Hall
Attorneys Patented Nov. 3, 1953

2,657,579

UNITED STATES PATENT OFFICE 2,657,579

LIQUID LEVEL INDICATING DEVICE

Frederick Roger Milsom, Boreham Wood, England, assignor to S. Smith & Sons (England) Limited, London, and Furzehill Laboratories Limited, Boreham Wood, England, Application February 4, 1952, Serial No. 269,869

5 Claims. (Cl. 73—304)

The present invention relates to devices of the kind which provide a continuous indication of the value of a variable electrical impedance, and is particularly applicable to liquid contents gauges in which an indication of the quantity of liquid in a container is provided by the variation in capacitance of a number of condensers distributed throughout the space to be occupied by the liquid, the dielectric of the condensers in the part not occupied by the liquid being substantially air and that in the part occupied by the liquid being substantially formed by the liquid.

It is the object of the present invention to provide a device of the kind referred to not involving the use of a mechanically variable comparison impedance.

According to the present invention a device of the kind referred to comprises an electric oscillator having a frequency-determining circuit of which the variable electrical impedance forms part, an inductor, said inductor also forming part of the frequency-determining circuit, a variable permeability ferromagnetic core for said inductor, a control winding upon said core, variation of the current through the control winding varying the inductance of the inductor, a buffer stage to the input of which is applied the output from the oscillator, an electric filter circuit with a sharp cut-off to the input of which is applied the output from the buffer stage, a rectifier adapted to rectify the output from said filter, and means to vary the current through the control winding in accordance with the output from said rectifier, the means being such that any tendency of the frequency of the oscillator to vary from the cut-off frequency of the filter upon variation of the impedance is opposed by appropriate variation of the inductance of the inductor, and a meter connected to indicate the magnitude of the said current whereby the deflection of the meter provides an indication of the magnitude of the variable impedance.

The means for varying the current in the control winding conveniently comprise an amplifier to whose input is applied the output from the rectifier and whose output provides the current through the control winding.

Preferably there is connected at some suitable point between the output of the rectifier and the input to the control winding a lag producing circuit producing oscillation of the current in the control winding at a frequency below that of the oscillator and above that to which the meter can respond, whereby the effects of hysteresis in the ferromagnetic core are substantially eliminated.

In the case in which the variable impedance is capacitative the oscillator most conveniently comprises a grid controlled thermionic valve, its frequency being controlled by a parallel resonant circuit of which at least part of the capacitative branch is formed by the variable impedance while at least part of the inductive branch is formed by the inductor.

A capacitance-type fuel contents gauge such as is mentioned above in which the present invention is utilised will now be described with reference to the accompanying drawing.

A tank, indicated at 5, contains a variable quantity of fuel 6 and has distributed within it a number of condenser plates, indicated at 4, so distributed within the tank that the capacitance varies substantially linearly with the volume of liquid 4 irrespective of its distribution within the tank. The capacitance of plates 4 forms part of the frequency-determining circuit associated with an oscillator valve 1. The remaining components in the frequency-determining circuit are a centre-tapped inductor 2 carried upon a ceramic-iron dust core 7 and a trimmer capacitor 3 connected in parallel with plates 4. The centre tap of inductor 2 is connected to earth line 33, one of its other terminals is connected to the grid of valve 1 via a capacitor 10 and a grid resistor 11 while the second is connected to the anode of the valve through a capacitor 9. The anode of valve 1 is connected to the positive supply line 32 through a resistor 12, so that valve 1 is connected in a shunt fed Hartley oscillator circuit. A control winding 8 is also carried upon the core 7, variation of the direct current in this serving to vary the effective inductance of the inductor.

The anode of valve 1 is connected via capacitor 13 and resistor 14 to the grid of a conventional pentode amplifier valve 15 (forming the buffer stage mentioned earlier). The output from the stage is obtained by means of a transformer 16 in the anode circuit of valve 15, Transformer 16 has two secondary windings; the first winding 17 is tightly coupled to the primary, and the other winding 18 is loosely coupled to the primary. The output from winding 17 is connected to the input of a bridged-T filter network 19 comprising capacitors 21—22, a ceramic dust cored inductor 20 and a resistor 23. The output terminals of filter 19 are connected to the primary winding 24 of a further transformer 25 whose secondary is connected to the input of a ring-bridge demodulator 26. The reference input to this demodulator is provided by the output from winding 18, and the output from the demodulator is developed across a capacitor 27, one terminal of which is earthed. The phase relationships between the windings 17, 18 and the connections of the demodulator 26 are such that as the frequency of the input to valve 15 is increased the voltage at the non-earthed terminal of capacitor 27 is positive for frequencies below the resonant frequency of filter 19 and falls rapidly to a zero or negative value as the frequency passes through the resonant frequency of the filter 19. The non-earthed terminal of capacitor 27 is connected through a resistor 28 and capacitor 29 to the grid of a second pentode valve 30 (forming the amplifier mentioned earlier). The anode of valve 30 is connected to the positive supply line 32 through a milliammeter 31 and winding 8 upon dust core 7 in series.

The screen and suppressor circuits for valves 15 and 30 and decoupling circuits for all the valves are conventional, and have been omitted for clarity.

The oscillator circuit, filter circuit etc. are so arranged that when the circuit is functioning correctly and the tank is empty the needle of meter 31 reads zero on the contents scale, the meter needle being off scale when no anode current is flowing in the anode circuit of valve 30.

The action of the circuit may most readily be appreciated by supposing the lag producing circuit comprised by resistor 28 and capacitor 29 to be omitted, i. e., by supposing the non-earthed terminal of capacitor 27 to be connected directly to the grid of valve 30.

If fuel is contained in tank 15 the capacitance in the oscillator circuit will be increased from its "empty" value, tending to lower its frequency. A decrease in frequency will result in a rise in the voltage at the grid of valve 30 and an increase of current in the control coil 8, decreasing the effective inductance in the oscillator circuit. As the change in control current for a small change in frequency will be very large (owing to the sharp resonance of filter 19 and the gain of valves 15 and 30) the frequency of the oscillator will be maintained substantially constant and the current in winding 8 will provide a measure of the volume of fuel in tank 5. The device is quite closely analogous to a servo system.

The effect of the lag circuit constituted by resistor 28 and capacitor 29 is, as in an analogous servo system, to produce fluctuation or hunting of the current in control coil 8. Impedances 28 and 29 are so chosen that the rate of the fluctuations is higher than that to which the milliammeter 31 can respond (e. g. of the order of 20 c./s.) so that 31 will provide a steady indication of the mean current through the control coil 8. The fluctuation ensures that hysteresis effects in the core 7 are substantially eliminated. The presence of such effects would result in different control currents (and consequently different indications) according as to whether the amount of fuel in the tank 5 happened to be increasing or decreasing.

The milliammeter 31 is conveniently calibrated to indicate the volume of a given liquid of known dielectric constant contained in tank 5.

It will be appreciated that the precise form of oscillator circuit used is unimportant; but it is important that no component of direct current from the oscillator should pass through the inductor winding. Such a component will affect the inductance of that winding and so the frequency of the oscillator and the indication provided.

It will be appreciated also that the precise form of filter circuit used is also unimportant, so long as it has a well-defined cut-off frequency.

In the embodiment shown the inductor comprised by inductor 2 and core 7 is conveniently similar to inductor 20, so that drift due to variation of the magnetic constants of the core material will be at least partially obviated.

I claim:

1. A device for giving a substantially continuous indication of the quantity of liquid in a container comprising a tank, a plurality of plates distributed throughout said tank, and a liquid of variable quantity within said tank, said liquid covering said plates in variable amount whereby said plates and liquid define a capacitive impedance of variable magnitude an electric oscillator, a frequency-determining circuit for said oscillator of which the variable capacitive impedance forms part, an inductor, said inductor also forming part of said frequency-determining circuit, a variable permeability ferro-magnetic core for said inductor, a control winding upon said core, variation of a current through the control winding serving to vary the impedance of the inductor, a buffer stage to the input of which is applied the output from the oscillator, an electric filter circuit with a sharp cut-off to the input of which is applied the output from the buffer stage, a rectifier adapted to rectify the output from said filter, and means to provide a current through the control winding in accordance with the output from said rectifier, said means being such that any tendency of the frequency of the oscillator to vary from the cut-off frequency of the filter upon variation of the impedance is opposed by appropriate variation of the inductance of the inductor, and a meter to indicate the magnitude of said current, the deflection of the meter thus providing an indication of the magnitude of the variable impedance.

2. A device as claimed in claim 1 wherein the means for varying the current in the control winding comprise an amplifier to whose input is applied the output from the rectifier and whose output provides the current through the control winding.

3. A device as claimed in claim 2 comprising also a lag producing circuit connected between the rectifier output and the said amplifier, said lag producing circuit comprising a series resistor between said rectifier and said amplifier and a capacitor coupled to said resistor and in shunt with said amplifier, said meter being connected in series with the output of said amplifier and said control winding, said lag producing circuit causing fluctuation of the current in the said control winding at a rate below that of the oscillator frequency and above that to which the meter can respond, so as substantially to eliminate the effects of hysteresis in the ferromagnetic core.

4. A device as claimed in claim 3 wherein the oscillator comprises a grid-controlled thermionic valve and the frequency-determining circuit is a parallel resonant circuit of which at least part of the capacitative branch is formed by the said plates and liquid within said tank and at least part of the inductive branch is formed by the said inductor.

5. A device as claimed in claim 4 wherein an impedance element of the filter has temperature-dependent properties similar to that of the inductor, to provide at least partial temperature-compensation.

FREDERICK ROGER MILSOM.

References Cited in the file of this patent

UNITED STATES PATENTS

| Number | Name | Date |
|---|---|---|
| 2,280,678 | Waymouth | Apr. 21, 1942 |
| 2,422,806 | Silverman et al. | June 24, 1947 |
| 2,441,035 | Rath | May 4, 1948 |
| 2,506,143 | Edelman | May 2, 1950 |